United States Patent
Allen et al.

(10) Patent No.: US 7,647,257 B2
(45) Date of Patent: Jan. 12, 2010

(54) SYSTEM AND METHOD FOR WEB ACCESS TO FINANCIAL DATA

(75) Inventors: Laurie Allen, Glendale, AZ (US); Steve Atkins, Phoenix, AZ (US); Dave Babcock, Phoenix, AZ (US); Pat Callahan, Scottsdale, AZ (US); Sean Hagan, Glendale, AZ (US); Norm Hanevich, PHX, AZ (US); Greg James, Glendale, AZ (US); Cheryl Kabrud, Glendale, AZ (US); Andy Nicholls, Kingwood, TX (US); Daniel Parks, Glendale, AZ (US); Brenda Rowley, Chandler, AZ (US); Elias Serrano, Phoenix, AZ (US); Ken Sheehan, New River, AZ (US); Tony Williams, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1046 days.

(21) Appl. No.: 10/608,764

(22) Filed: Jun. 27, 2003

(65) Prior Publication Data

US 2004/0225603 A1 Nov. 11, 2004

Related U.S. Application Data

(60) Provisional application No. 60/468,495, filed on May 6, 2003.

(51) Int. Cl.
*G06Q 99/00* (2006.01)
(52) U.S. Cl. .......................................................... 705/30

(58) Field of Classification Search .................... 705/30, 705/35–40
See application file for complete search history.

(56) References Cited

U.S. PATENT DOCUMENTS

| | | | | |
|---|---|---|---|---|
| 5,189,608 | A | | 2/1993 | Lyons et al. |
| 5,255,184 | A | * | 10/1993 | Hornick et al. ................ 705/6 |
| 5,570,283 | A | * | 10/1996 | Shoolery et al. ............... 705/5 |
| 5,699,528 | A | | 12/1997 | Hogan |
| 5,710,889 | A | | 1/1998 | Clark et al. |
| 5,787,403 | A | | 7/1998 | Randle |
| 5,842,185 | A | | 11/1998 | Chancey et al. |
| 5,852,812 | A | | 12/1998 | Reeder |
| 5,890,140 | A | | 3/1999 | Clark et al. |
| 5,903,881 | A | | 5/1999 | Schrader et al. |
| 6,009,408 | A | * | 12/1999 | Buchanan ..................... 705/11 |
| 6,012,050 | A | | 1/2000 | Eaton et al. |
| 6,047,268 | A | * | 4/2000 | Bartoli et al. ................. 705/35 |

(Continued)

*Primary Examiner*—Thu-Thao Havan
*Assistant Examiner*—Thomas M Hammond, III
(74) *Attorney, Agent, or Firm*—Snell & Wilmer L.L.P.

(57) ABSTRACT

A web application that enables access to a client's specific account transaction detail. The charge transaction detail can include anything related to charge or credit card transactions including travel transaction detail, corporate card detail and corporate purchasing card detail. The transaction detail can be captured from many sources and can include third party data. The clients can use a web application and web page to access the account data and create report views of the information. The system can also includes a create a report capability, which allows users to add filters and data elements to an existing report format and create a report specific to their needs and data.

12 Claims, 7 Drawing Sheets

U.S. PATENT DOCUMENTS

| | | |
|---|---|---|
| 6,078,907 A | 6/2000 | Lamm |
| 6,128,602 A | 10/2000 | Northington et al. |
| 6,128,603 A | 10/2000 | Dent et al. |
| 6,154,729 A | 11/2000 | Cannon et al. |
| 6,185,542 B1 | 2/2001 | Moran et al. |
| 6,185,544 B1 | 2/2001 | Sakamoto et al. |
| 6,202,054 B1 | 3/2001 | Lawlor et al. |
| 6,285,991 B1 | 9/2001 | Powar |
| 6,292,789 B1 | 9/2001 | Schutzer |
| 6,304,857 B1 | 10/2001 | Heindel et al. |
| 6,343,279 B1 | 1/2002 | Bissonette et al. |
| 6,351,739 B1 | 2/2002 | Egendorf |
| 6,385,595 B1 | 5/2002 | Kolling et al. |
| 6,442,526 B1 | 8/2002 | Vance et al. |
| 6,446,048 B1 | 9/2002 | Wells et al. |
| 6,493,685 B1 | 12/2002 | Ensel et al. |
| 6,704,039 B2 | 3/2004 | Pena |
| 6,959,339 B1 * | 10/2005 | Wu et al. .................... 709/246 |
| 2001/0047336 A1 | 11/2001 | Maycock, Jr. et al. |
| 2001/0056387 A1 | 12/2001 | Magary et al. |
| 2002/0069122 A1 | 6/2002 | Yun et al. |
| 2002/0123948 A1 | 9/2002 | Yumoto |
| 2002/0133605 A1 * | 9/2002 | Khanna et al. .............. 709/229 |
| 2002/0194127 A1 | 12/2002 | Randell et al. |
| 2003/0023524 A1 | 1/2003 | Sugimoto et al. |
| 2003/0023550 A1 | 1/2003 | Lee |
| 2003/0061132 A1 | 3/2003 | Yu, Sr. et al. |
| 2003/0097331 A1 | 5/2003 | Cohen |
| 2003/0144956 A1 | 7/2003 | Yu, Jr. et al. |
| 2003/0191711 A1 | 10/2003 | Jamison et al. |
| 2003/0229588 A1 | 12/2003 | Falk et al. |
| 2004/0054626 A1 | 3/2004 | Fuentes |

\* cited by examiner

SYSTEM AND METHOD FOR WEB ACCESS TO FINANCIAL DATA

REFERENCE TO RELATED APPLICATION

This application claims priority to, and the benefit of, U.S. Provisional Patent Application Ser. No. 60/468,495, filed on May 6, 2003, the entire contents of which are incorporated herein by reference.

FIELD OF INVENTION

The present invention generally relates to providing data to customers on-line, and more particularly, to a system and method to enable charge card holders and others with a web application to access charge card detail on-line via a network.

BACKGROUND OF THE INVENTION

Previous options for clients to view and receive certain reports (e.g., Management Information Reports) were to, for example, receive the reports on paper each month, receive the reports as a data file, or receive data on diskette and/or a CD which was loaded into PC based applications for viewing and reporting. However, these delivery mechanisms were slow (in some cases 90-days after the close of a quarter) and costly. As such, a need existed for an on-line capability to replace or enhance the distribution options. However, available on-line tools, for example, were not able to be sufficiently developed because of the complexity of data capture and conditioning from multiple sources, the excessive volume of transaction level detail needed to provide the full functionality required and the lack of technology options to create solutions.

SUMMARY OF THE INVENTION

An apparatus and method consistent with the present invention provides on-line financial account data to users. In response to an on-line request from a user for account data, the method and apparatus retrieve data on-line from multiple sources to compile the account data. The account data is then conditioned and sent on-line to the user, typically in a report format.

BRIEF DESCRIPTION OF THE DRAWINGS

The accompanying drawings, wherein like reference numerals represent like elements, are incorporated in and constitute a part of this specification and, together with the description, explain the advantages and principles of the invention. In the drawings.

DETAILED DESCRIPTION

Overview

Figure 1:
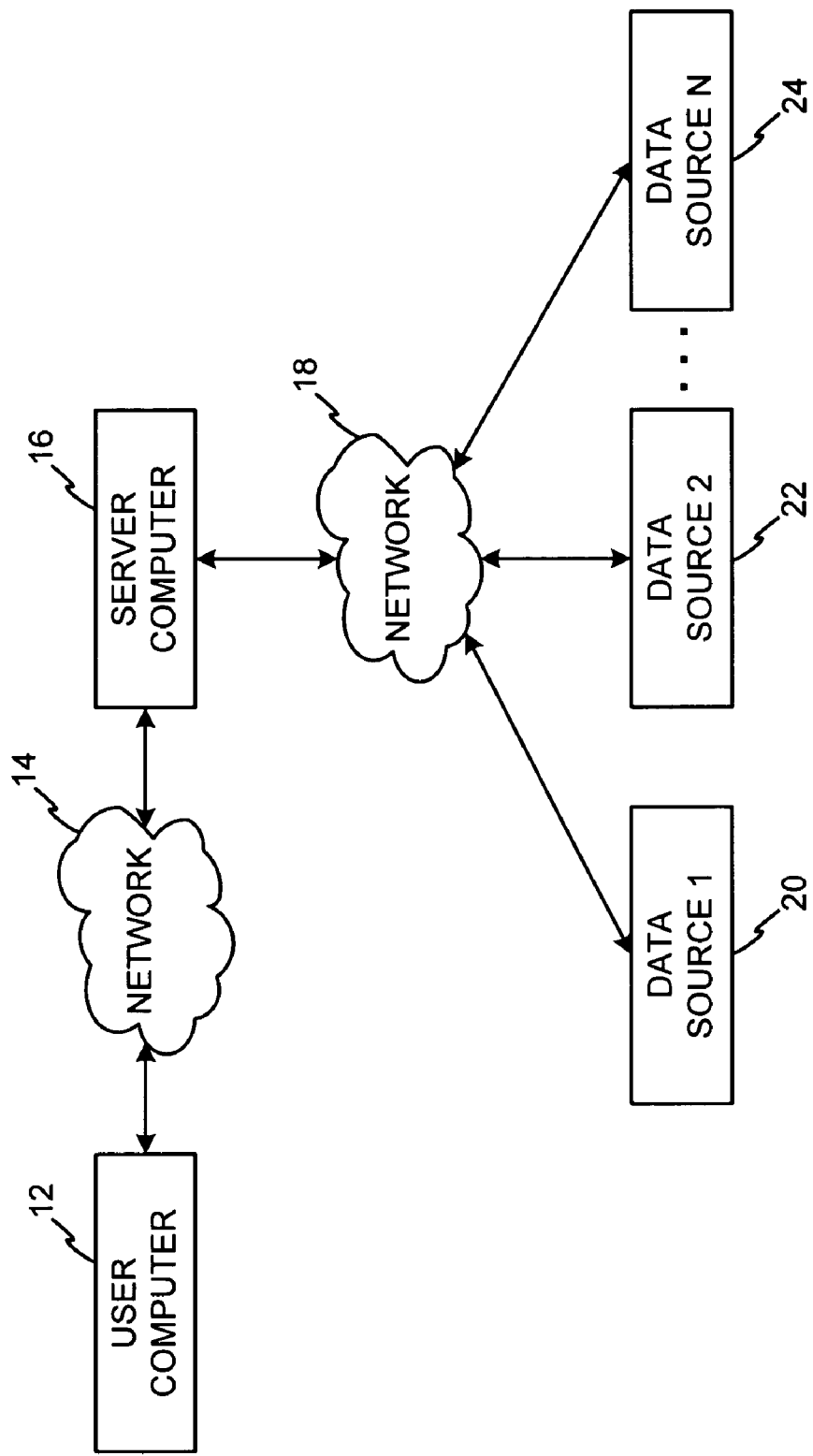
FIG. 1 is a schematic diagram of an exemplary system for providing on-line account data.

Exemplary embodiments include a web application that enables access to a client's specific account transaction detail for the purposes of, for example, vendor negotiation and card program management. The charge transaction detail includes, for example, travel transaction detail, corporate card detail, loyalty information detail and corporate purchasing card detail. In one embodiment, the transaction detail is global in nature (e.g., data captured from all regional systems) and can include third party data regarding both card and travel, as well as reference data which can be purchased from multiple industry vendor sources. The term "charge card" is intended to include credit cards, debit cards, stored value cards, and non-card based financial instruments.

The web application and web page access that clients use to access the data and create report views of the information can be implemented with, for example, a third party software package from a company called MicroStrategy. The product enables clients to manage their corporate program with a host as the card provider, along with their own travel management performance and policies. In addition, the product enables the clients to negotiate purchase opportunities with key vendors (airlines, hotels etc).

The system can also include a "create a report capability" which allows users to add filters and data elements to an existing report format and create a report specific to their needs and data. The system includes access for the clients to individual market level detail, along with LAC, EMEA, and JAPA (Latin America/Caribbean, Europe, Middle East, Africa, and Japan, Asia, Pacific, Australia) transaction detail. The system also allows report generation wherein the reports include LID (line item detail) data from the clients' Corporate Purchase Card (CPC) purchases, thereby allowing the user to view specific detailed transactions from their selected vendors. This feature includes full hierarchy information and enhanced reporting capabilities. The system also includes Corporate Purchasing card data in its warehouse, which allows clients to view their total program with the host. It also allows clients to combine the data sets and have a single report generated on both CPC and Card spend. The functionality and access allows faster delivery of information to clients which results in, for example, increased client loyalty.

In an exemplary embodiment, the web application eliminates or reduces the need for any 'helper' applications on the web browser, provides a more scalable application and allows clients to access certain data and create report views of the information. Removal of the 'helper apps' (e.g., Active-X or Java Applets), in one embodiment, allows greater market penetration since these applications have been shown in some instances to be security risks. The invention also eliminates the need for a separate security log-in function and allows implementation of a single sign-on capability. As such, clients can log into a single portal and are automatically logged into applications within the portal without having to re-authenticate.

A product implementing an exemplary embodiment is a combination of function, features, data and support service. More particularly, in one embodiment, the product is accessed via a web site which is specifically focused on corporate accounts, the program administrator and the corporate card member. The database is a combination of charge card information (transactions) from every region and country that the host operates as a wholly owned organization or as a franchise or partnership. The collection, consolidation, data management and conditioning of that data are unique in several areas. The database adds and conditions data with proprietary information relating to the host supplier network. This allows the clients using the product to view and report on their corporate spend in key categories (e.g., industries). The data conditioning process for the database captures and consolidates multiple data sources from industry providers. There are also multiple airline data feeds and computerized reservation system (CRS) data feeds providing additional enriched data such as air sectors (travel itinerary) fare basis codes, etc. Many of these data feeds can be purchased by the host on behalf of the client and the data is integrated with their account data.

The client can report on this data in multiple views, either an individual country, a region, or on a global basis. The reporting functionality is also a combination of unique products and services. The tool provides a single sign on capability which allows the client to sign on once at the central web site and then access multiple services and functions, wherein one of these functions is the enhanced reporting capability. The client has the ability to view their spend via a web browser while no software is required to be loaded on the client PC. The clients have access to a set of standard reports or have the ability to develop a view of the data (report) that they request and create on-line. The reports can be viewed on-line, printed or exported into other software formats such as Excel at the client site. The charge card information is provided in, for example, two forms such as billed and unbilled; and the client can view either through the reporting tool. Additionally, the client can view their Corporate Purchase Card data and their Corporate Card charges as separate sets of data or on a combined report.

Examples of problems solved with this product:

A person who is responsible for supplier management and vendor negotiations can ask, 'What was the total number of transactions and spend my company put on American Express Corporate Cards on all flights between Rome and Sydney? I want to compare 1Q 2003 to 1Q 2002 for Virgin Atlantic and British Airways.'

A person managing a cost center can ask, 'Where have my folks used their American Express Cards over the past month?'

Portfolio Web Network

FIG. 1 is a schematic diagram of a system 10 for providing on-line account data. In system 10, a user at a user computer 12 can submit an on-line request to a server computer 16, via a network 14, for charge card transaction details. Server computer 16, via a network 18, can access multiple data sources 20, 22, and 24 to obtain the charge card transaction detail for the user. Once it obtains the data, server computer 16 can condition the data, as it often will be retrieved from multiple disparate sources (including any combination of internal or external data sources), and format the data into a report. Server computer 16 can then send the report to user computer 12 via network 14 in, for example, a web page or other format. Networks 14 and 18 can include any wireline or wireless network for data communication. The communication across the network may be achieved using web services technology, including but not limited to Simple Object Access Protocol (SOAP), Web Services Description Language (WSDL), or Universal Description, Discovery and Integration (UDDI). Three data sources are shown for illustrative purposes only; embodiments can include more or fewer data sources depending upon a particular implementation. The data sources 20, 22, and 24 represent any source of data such as, a local or remote memory or database, possibly in conjunction with an associated computer.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Figure 2:
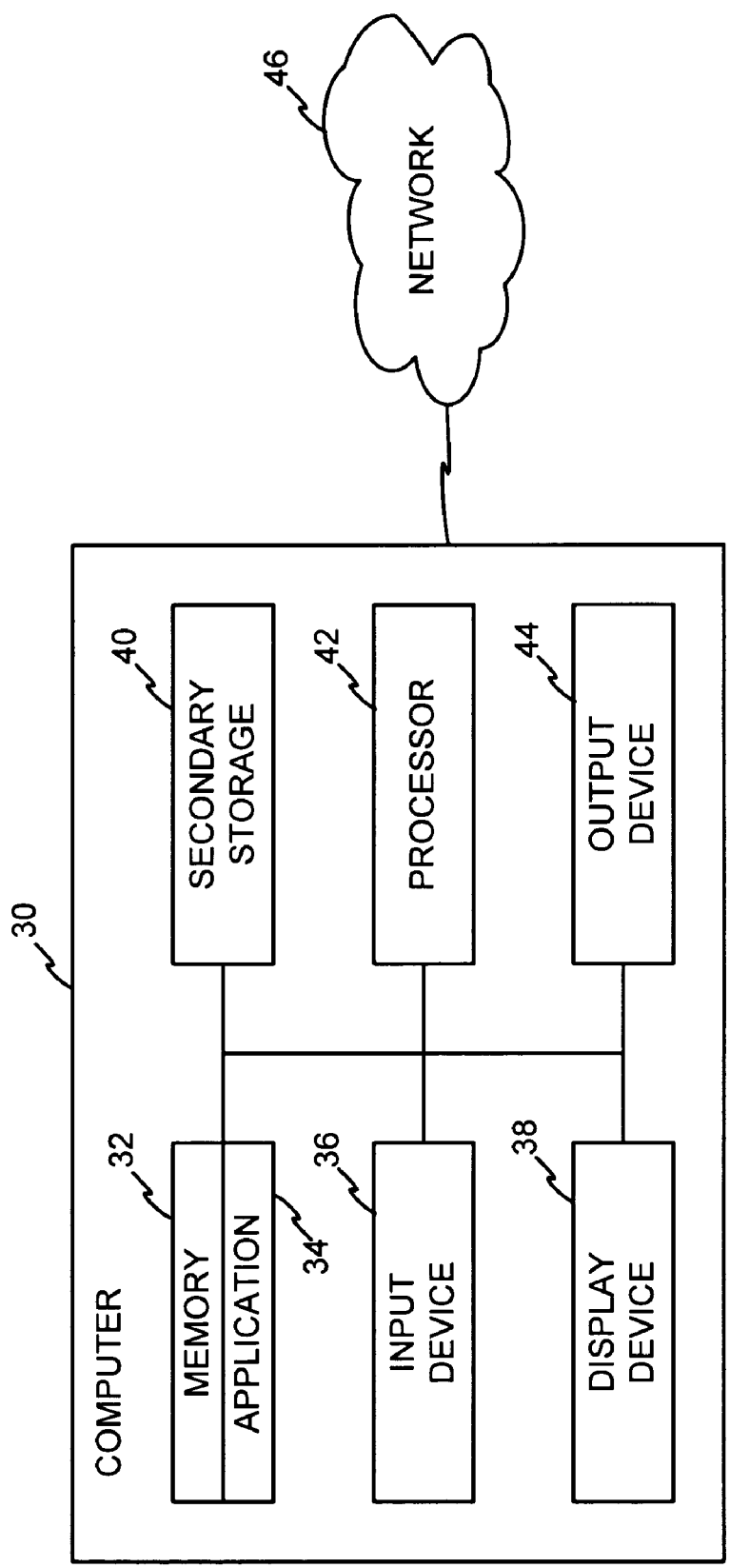
FIG. 2 is a schematic diagram of exemplary components of computers and servers used in the system.

FIG. 2 is a schematic diagram of an exemplary computer 30 illustrating typical components of the computers and server shown in FIG. 1 for the system. Computer 30 may include a connection with a network 46 such as the Internet or communications networks through any suitable network connection using, for example, TCP/IP for data transmission. Computer 30 typically includes a memory 32, a secondary storage device 40, a processor 42, an input device 36 for entering information into computer 30, a display device 38 for providing a visual display of information, and an output device 44 for outputting information such as in hard copy or audio form.

Memory 32 may include random access memory (RAM) or similar types of memory, and it may store one or more applications 34 for execution by processor 42. Applications 34 may include programming to perform the methods discussed herein.

Secondary storage device 40 may include any hardware and/or software for storing data such as, for example, a hard disk drive, floppy disk drive, CD-ROM drive, or other types of non-volatile data storage. Processor 42 may execute applications or programs stored in memory 32 or secondary storage 40, or received from the Internet or other network 46. Although computer 30 is depicted with various components, one skilled in the art will appreciate that the computer may contain different components.

Computer 30 may include local or remote databases for storing and retrieving information for processing transactions. Any databases discussed herein may be any type of database, such as relational, graphical, hierarchical, object-oriented, and/or the like. Common database products that may be used to implement the databases include UDB by IBM (White Plains, N.Y.), any of the database products available from Oracle Corporation (Redwood Shores, Calif.), Microsoft Access or MSSQL by Microsoft Corporation (Redmond, Wash.), or any other database product. The database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

The system, as shown in FIG. 1, may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that may be used in association with the present invention. As those skilled in the art may appreciate, user computer may typically include an operating system (e.g., Windows NT, 95/98/2000, Linux, Solaris, etc.) as well as various conventional support software and drivers typically associated with computers. User computer may be in a home or business environment with access to a network. In an exemplary embodiment, access is through the Internet through a commercially-available web-browser software package.

Communication between the parties to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art may also appreciate that, for security reasons, any databases, systems, or components of the present invention may include any combination of databases or components at a single location or at multiple locations, wherein each database or system includes any of various suitable security features, such as firewalls, access codes, encryption, decryption, and/or the like.

The computers discussed herein may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system.

Portfolio Web Methods

Figure 3:
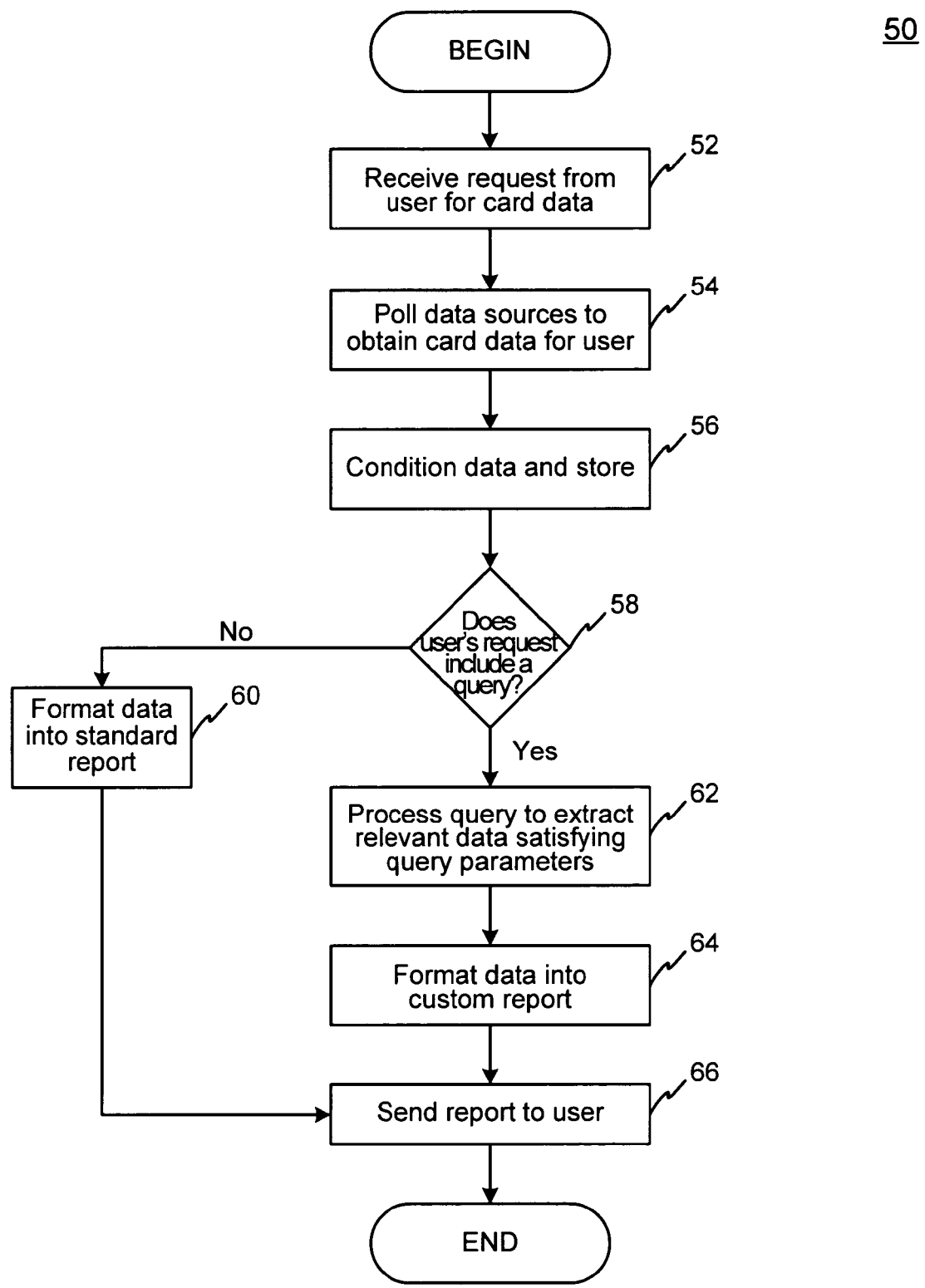
FIG. 3 is a flow chart of an exemplary method to provide on-line account data.

FIG. 3 is a flow chart of an exemplary method 50 to provide on-line account data, which may include card data. Method 50 may be implemented in, for example, software modules for execution by user computer 12 and server computer 16. Although the steps of method 50 are shown in a particular order, they may alternatively be executed in other orders and more steps may be added or steps removed, if necessary or desired.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flow chart illustrations of methods, apparatus (e.g., systems), and computer program products according to various aspects of the invention. It may be understood that each functional block of the block diagrams and the flow chart illustrations, and combinations of functional blocks in the block diagrams and flow chart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flow chart block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function specified in the flow chart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flow chart block or blocks.

Accordingly, functional blocks of the block diagrams and flow chart illustrations support combinations of means for performing the specified functions, combinations of steps for performing the specified functions, and program instruction means for performing the specified functions. It may also be understood that each functional block of the block diagrams and flow chart illustrations, and combinations of functional blocks in the block diagrams and flow chart illustrations, may be implemented by either special purpose hardware-based computer systems which perform the specified functions or steps, or suitable combinations of special purpose hardware and computer instructions.

In method 50, server computer 16 receives a request from a user at user computer 12 for account data (step 52). The "account data" can include any data related to transactions involving credit cards, charge cards, or other financial cards. User computer 12 may include, for example, a software application to help facilitate the user's communication with server computer 16. The request may be received from a user or other person, for example, at the requesting entity. As used herein, the term "end user", "consumer", "customer", "supplier", "cardmember", "business" or "merchant" may be used interchangeably with each other, and each shall mean any person, entity, machine, hardware, software or business. The card issuing institutions may include credit card companies, card sponsoring companies, or third party issuers under contract with financial institutions. It is further noted that other participants may be involved in some phases of the transaction, such as an intermediary settlement institution, but these participants are not shown.

Figure 4:
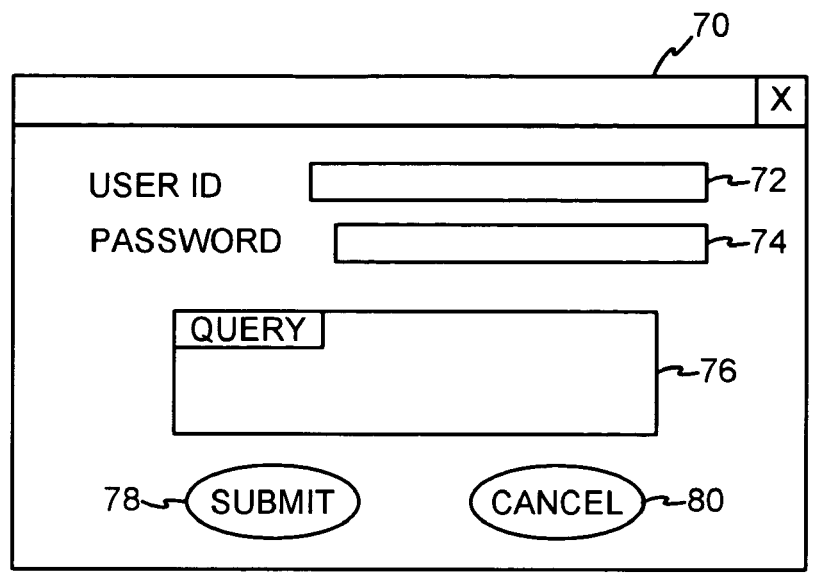
FIG. 4 is a diagram of an exemplary web page for submitting an on-line request for account data.
Figure 6:
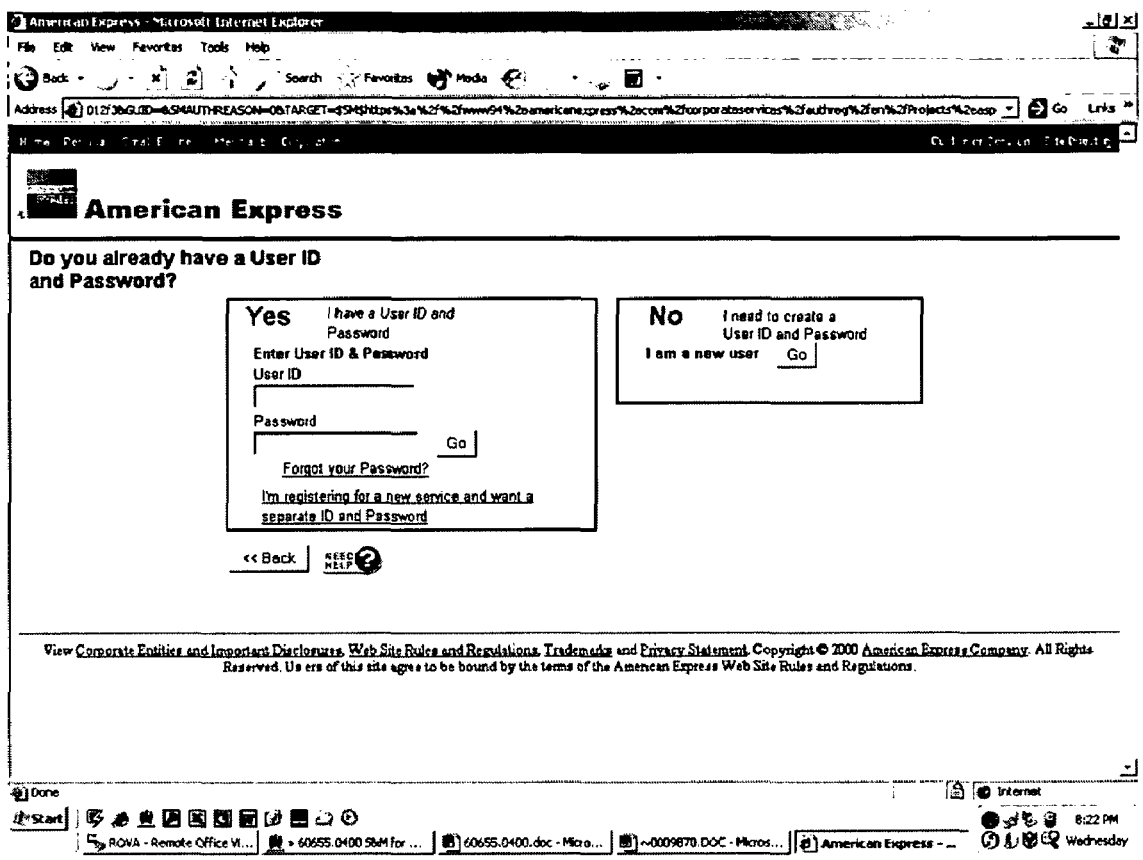
FIG. 6 is a diagram illustrating an example of a web page for a user to log into the system.
Figure 7:
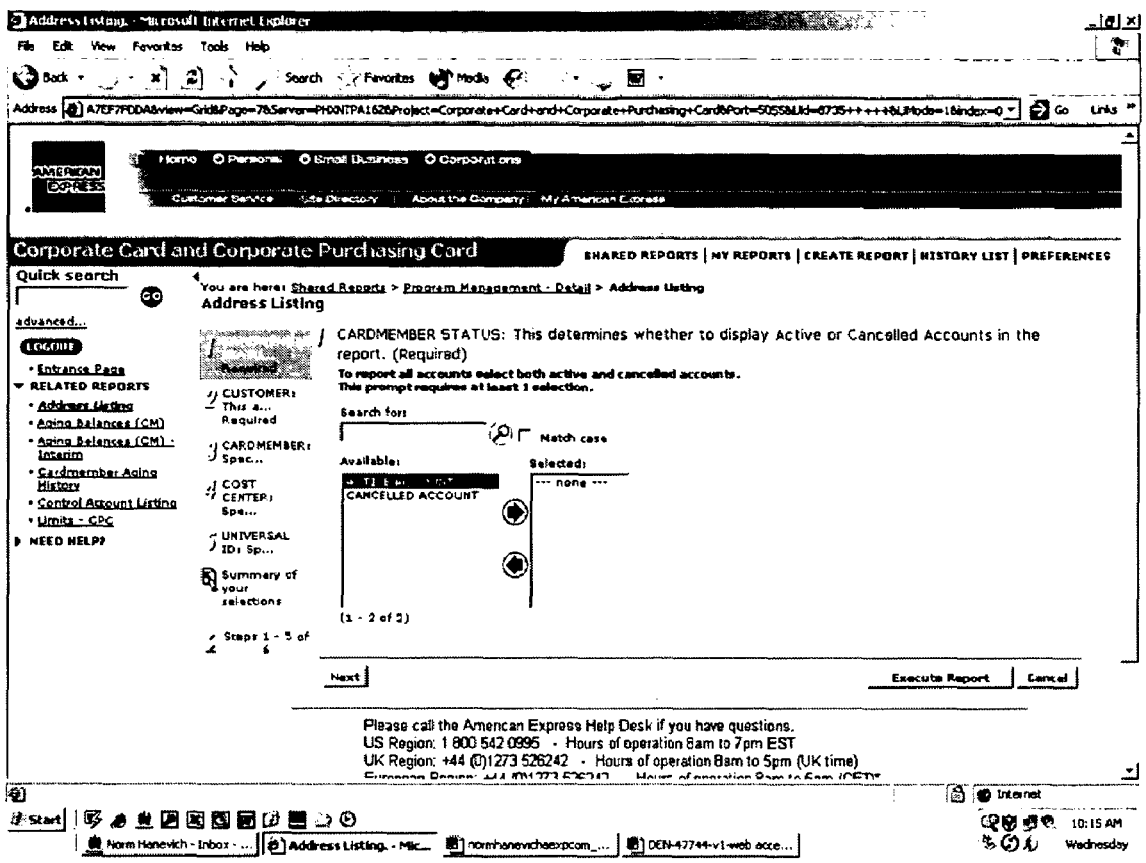
FIG. 7 is a diagram illustrating an example of a detailed web page for submitting an on-line request for account data.

FIG. 4 is a diagram of an exemplary screen 70 for a user to enter a request for account data and submit it to server computer 16. FIGS. 6 and 7 illustrate examples of more detailed screens for a user to log into the system and submit an on-line request for account data.

Screen 70 can be implemented in, for example, a web page for network transmission. The term "web page" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like. A server may include a webservice which receives a request from a browser which includes a URL and an IP address (e.g., 127.0.0.1). The webservice retrieves the appropriate web pages and sends the web pages to the IP address.

In screen 70, a user can enter a user name or other identifier in a section 72 and a password in a section 74. A section 76 allows a user to enter a particular query, which can include a request for account data within certain parameters, examples of which are provided above. The user can select a section 78 to submit the request or select a section 80 to cancel the request.

The request may optionally include an account number. An "account number", as used herein, may include any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, transponder, radio frequency card and/or the like. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format may generally use four spaced sets of numbers, as represented by the number "0000 0000 0000

0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

After receiving the request, server computer 16 polls or otherwise contacts data sources 20, 22, and 24 to obtain the account data for the user's request (step 54). Server computer 16 conditions the data and can store it (step 56). Server computer 16 can use, for example, metadata in order to determine how to locate and retrieve the account data. In particular, a relationship can be defined between the query (request) attributes and metrics, and target data sources to assure the integrity of the account data report returned to the user.

Server computer 16 also determines if the user's request includes a query, as represented in section 76 of screen 70 (step 58). If the request does not include a query, server computer 16 can format the conditioned data into a standard or default report (step 60).

If the request included a query (step 58), server computer 16 processes the query to extract the relevant data satisfying the query parameters (step 62). A query, as submitted by a user, can include a request for account data satisfying certain parameters. Processing the query can include parsing the natural language submitted query to generate search parameters. Those parameters can be used to obtain the relevant data using, for example, the metadata. Server computer 16 can format the extracted data into a custom report (step 64). Once the report is compiled and formatted, server computer 16 can send the standard or custom report to user computer 12 via network 14 (step 66).

Figure 5:
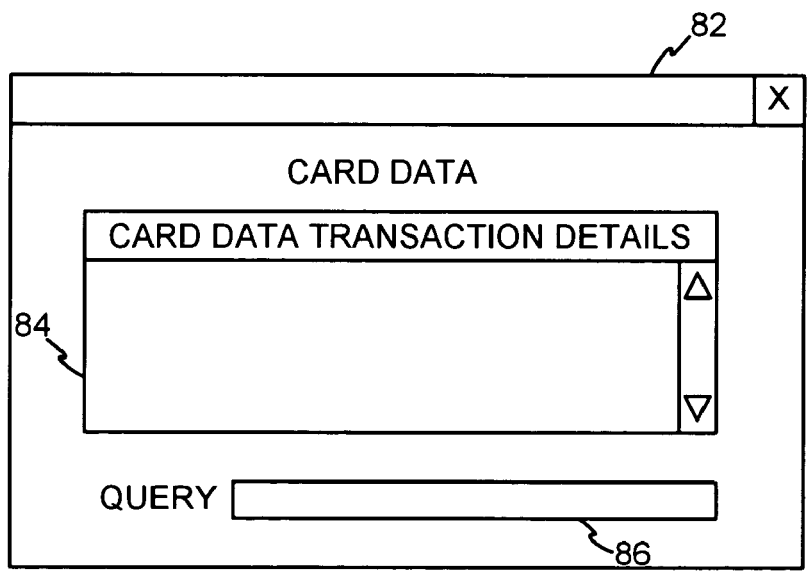
FIG. 5 is a diagram of an exemplary web page for providing on-line account data.
Figure 8:
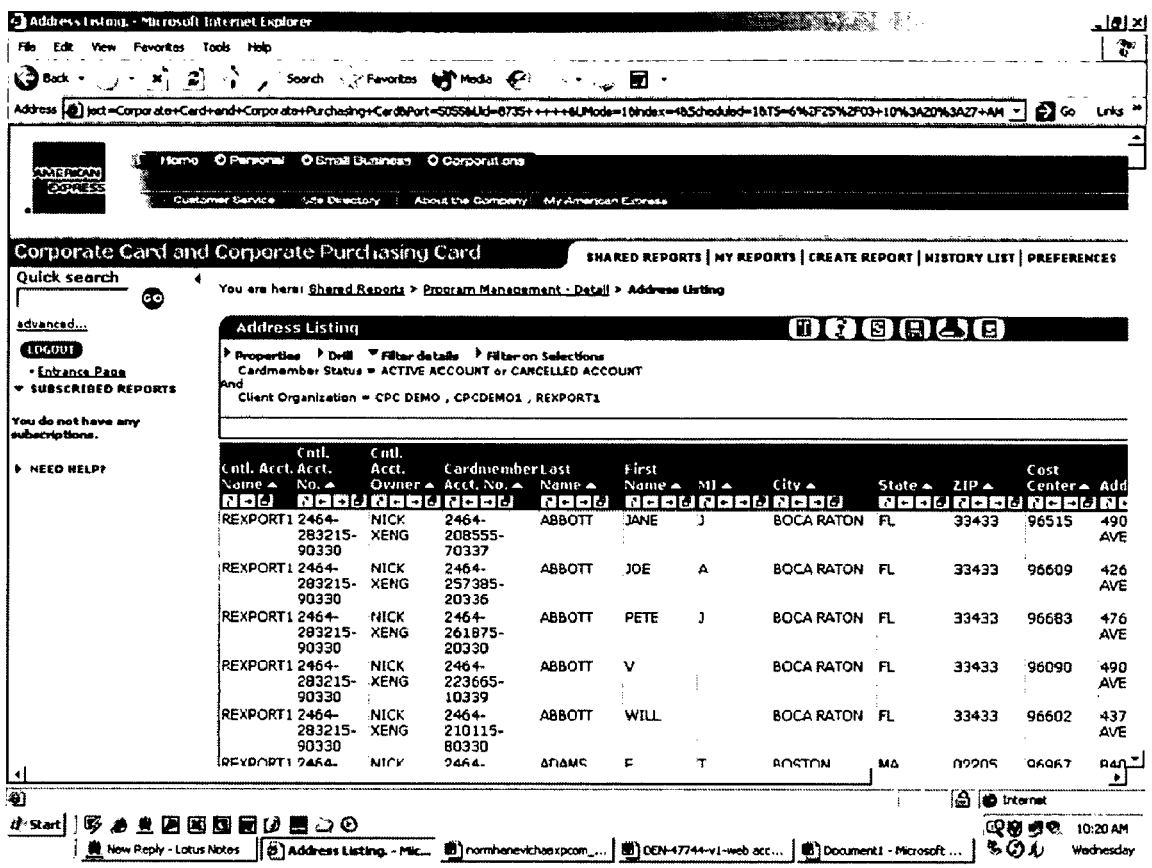
FIG. 8 is a diagram illustrating an example of a web page for providing on-line account data.

FIG. 5 is a diagram of an exemplary screen 82 for providing on-line account data. FIG. 8 illustrates an example of a more detailed screen for providing on-line account data. Screen 82 can be implemented, for example, in a web page for network transmission. Screen 82 can include a section 84 for providing the report details and can optionally include a section 86 to repeat the user's query, if one was submitted.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The detailed description of exemplary embodiments of the invention herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

The invention claimed is:

1. A computerized method for providing a travel expense report to users, comprising:

receiving, at a transaction processor, a request for the travel expense report, wherein the request includes data selection criteria comprising a corporate transaction account provider identifier, an air sector, and a fare basis code, and wherein the transaction processor is a host computer;

parsing, by the transaction processor, the request to retrieve the data selection criteria from a natural language query in response to the request including the natural language query, wherein the data selection criteria includes metadata comprising:
   (i) instructions for where to access travel transaction data,
   (ii) instructions for where to access financial account data,
   (iii) instructions for how to access the travel transaction data,
   (iv) instructions for how to access the financial account data,
   (v) instructions for retrieving travel transaction data,
   (vi) instructions for retrieving financial account data,
   (vii) protocols that are used to access the travel transaction data,
   (viii) protocols that are used to access the financial account data,
   (ix) a location identifier corresponding to a plurality of disparate travel sources,
   (x) protocol instructions for the plurality of disparate travel sources,
   (xi) a location identifier corresponding to a plurality of disparate financial sources,
   (xii) protocol instructions for the plurality of disparate financial sources, and
   (xiii) a defined relationship between attributes and metrics of the natural language query and target data sources;

receiving, at the transaction processor, a categorized view instruction, wherein the categorized view instruction determines a data placement and format for the travel expense report;

formatting, by the transaction processor, the data selection criteria in accordance with the metadata, wherein the plurality of disparate travel sources comprise at least one of: a Customer Reservations System (CRS) and an air carrier which store the travel transaction data including travel cost data;

and wherein the plurality of disparate financial sources comprise financial account providers which store the financial transaction account data including financial charge data;

retrieving, by the transaction processor, the financial transaction account data, including the financial charge data, from at least one of the plurality of disparate financial sources in accordance with the data selection criteria;

retrieving, by the transaction processor, the travel transaction data from at least one of the plurality of disparate travel sources in accordance with the data selection criteria, wherein the travel transaction data includes the travel cost data, the air sectors, and the fare basis codes provided by the air carrier and, wherein the travel transaction data is obtained by the transaction processor;

adding, by the transaction processor, proprietary information to the financial transaction account data and the travel transaction data, wherein the proprietary information relates to a host supplier network;

adding, by the transaction processor, to the travel expense report, line item detail including the financial charge data from the financial transaction account data and from the travel transaction data;

positioning, by the transaction processor, each of the data elements in accordance with the categorized view instruction, wherein the data elements are marked as billed or unbilled;

conditioning, by the transaction processor, the data elements to transform the data elements into the travel expense report for transmission to a client;

converting the financial transaction account data and the transaction data from the disparate travel sources and the disparate financial sources into a single format; and sending, by the transaction processor, the travel expense report to a client, wherein the client analyzes the travel expense report to determine a level of spend for a defined item over a defined time.

2. The method of claim 1, further including transforming the processed financial transaction account data into a report.

3. The method of claim 2, further including:
receiving a query associated with the request;
processing the financial transaction account data and the travel transaction data to extract account data satisfying parameters of the query; and
sending the extracted account data to a client.

4. The method of claim 3, further including formatting the extracted account data into a report.

5. A computerized method for a user to obtain a travel expense report, comprising:
submitting, using a computerized input device, a request for the travel expense report, wherein the request includes data selection criteria comprising a corporate transaction account provider identifier, an air sector, and a fare basis code and, wherein the request causes a host processor to:
parse the request to retrieve the data selection criteria from a natural language query in response to the request including the natural language query, wherein the data selection criteria includes metadata comprising:
(i) instructions for where to access travel transaction data,
(ii) instructions for where to access financial account data,
(iii) instructions for how to access the travel transaction data,
(iv) instructions for how to access the financial account data,
(v) instructions for retrieving travel transaction data,
(vi) instructions for retrieving financial account data,
(vii) protocols that are used to access the travel transaction data,
(viii) protocols that are used to access the financial account data,
(ix) a location identifier corresponding to a plurality of disparate travel sources,
(x) protocol instructions for the plurality of disparate travel sources,
(xi) a location identifier corresponding to a plurality of disparate financial sources,
(xii) protocol instructions for the plurality of disparate financial sources, and
(xiii) a defined relationship between attributes and metrics of the natural language query and target data sources;

receive a categorized view instruction, wherein the categorized view instruction determines a data placement and format for the travel expense report;

format the data selection criteria in accordance with the metadata, wherein the plurality of disparate travel sources comprise at least one of a Customer Reservations System (CRS) and an air carrier which store the travel transaction data including travel cost data;

and wherein the plurality of disparate financial sources comprise financial account providers which store the financial transaction account data including financial charge data;

retrieve the financial transaction account data, including the financial charge data, from at least one of the plurality of disparate financial sources in accordance with the data selection criteria;

retrieve the travel transaction data from at least one of the plurality of disparate travel sources in accordance with the data selection criteria, wherein the travel transaction data includes the travel cost data, the air sectors, and the fare basis codes provided by the air carrier and, wherein the travel transaction data is obtained by the transaction processor;

add proprietary information to the financial transaction account data and the travel transaction data, wherein the proprietary information relates to a host supplier network;

condition the data elements to transform the data elements into the travel expense report, wherein the travel expense report includes line item detail including financial charge data from the financial transaction account data and travel transaction data, and convert the financial transaction account data and the transaction data from the disparate travel sources and the disparate financial sources into a single format;

position each of the data elements in accordance with the categorized view instruction, wherein the data elements are marked as billed or unbilled; and send the travel expense report to a client, wherein the client analyzes the travel expense report to determine a level of spend for a defined item over a defined time.

6. The method of claim 5, further including receiving the travel expense report within a formatted report.

7. The method of claim 6, farther including:
submitting a query associated with the request, wherein the query causes the host to process the retrieved transaction financial account data and the travel transaction data to extract account data satisfying parameters of the query; and
receiving the extracted account data.

8. The method of claim 7, further including receiving the extracted account data within a formatted report.

9. A system for providing an on-line travel expense report, the system configured to:
receive a request for the travel expense report, wherein the request is created at a computerized input device and is received by the system over a computer network, and wherein the request includes data selection criteria comprising a corporate transaction account provider identifier, an air sector, and a fare basis code;
parse the request to retrieve the data selection criteria from a natural language query in response to the request including the natural language query, wherein the data selection criteria includes metadata comprising
(i) instructions for where to access travel transaction data, (ii) instructions for where to access financial account data,
(iii) instructions for how to access the travel transaction data,
(iv) instructions for how to access the financial account data,
(v) instructions for retrieving travel transaction data,
(vi) instructions for retrieving financial account data,
(vii) protocols that are used to access the travel transaction data,
(viii) protocols that are used to access the financial account data,
(ix) a location identifier corresponding to a plurality of disparate travel sources,
(x) protocol instructions for the plurality of disparate travel sources,
(xi) a location identifier corresponding to a plurality of disparate financial sources,
(xii) protocol instructions for the plurality of disparate financial sources, and
(xiii) a defined relationship between attributes and metrics of the natural language query and target data sources;

receive a categorized view instruction, wherein the categorized view instruction determines a data placement and format for the travel expense report;

format the data selection criteria in accordance with the metadata, wherein the plurality of disparate travel sources comprise at least one of: a Customer Reservations System (CRS) and an air carrier which store the travel transaction data including travel cost data; and wherein the plurality of disparate financial sources comprise financial account providers which store the financial transaction account data including financial charge data;

retrieve, from a database, the financial transaction account data, including the financial charge data, from at least one of the plurality of disparate financial sources in accordance with the data selection criteria;

retrieve the travel transaction data from at least one of the plurality of disparate travel sources in accordance with the data selection criteria, wherein the travel transaction data includes the travel cost data, the air sectors, and the fare basis codes provided by the air carrier and, wherein the travel transaction data is obtained by the transaction processor;

add proprietary information to the financial transaction account data and the travel transaction data, wherein the proprietary information relates to a host supplier network;

add to the travel expense report, line item detail including the financial charge data from the financial transaction account data and from the travel transaction data;

position each of the data elements in accordance with the categorized view instruction, wherein the data elements are marked as billed or unbilled;

condition the data elements to create the travel expense report for transmission to a client;

convert the financial transaction account data and the transaction data from the disparate travel sources and the disparate financial sources into a single format; and send the travel expense report to a client, wherein the client analyzes the travel expense report to determine a level of spend for a defined item over a defined time.

10. A computer readable medium, tangibly embodied with instructions which, when executed by a computer, perform the steps comprising:

receiving a request for account data;
retrieving data from multiple sources to obtain the account data;
conditioning the account data for transmission to a client computer;
receiving the requested account data on-line;
submitting a request for account data, wherein the request includes data selection criteria comprising a corporate transaction account provider identifier, an air sector, and a fare basis code and, wherein the request causes a host to:

parse the request to retrieve the data selection criteria from a natural language query in response to the request including the natural language query, wherein the data selection criteria includes metadata comprising:
(i) instructions for where to access travel transaction data,
(ii) instructions for where to access financial account data,
(iii) instructions for how to access the travel transaction data,
(iv) instructions for how to access the financial account data,
(v) instructions for retrieving travel transaction data,
(vi) instructions for retrieving financial account data,
(vii) protocols that are used to access the travel transaction data,
(viii) protocols that are used to access the financial account data,
(ix) a location identifier corresponding to a plurality of disparate travel sources,
(x) protocol instructions for the plurality of disparate travel sources,
(xi) a location identifier corresponding to a plurality of disparate financial sources,
(xii) protocol instructions for the plurality of disparate financial sources, and
(xiii) a defined relationship between attributes and metrics of the natural language query and target data sources;

receive a categorized view instruction, wherein the categorized view instruction determines a data placement and format for the travel expense report;

format the data selection criteria in accordance with the metadata, wherein the plurality of disparate travel sources comprise at least one of a Customer Reservations System (CRS) and an air carrier which store the travel transaction data including travel cost data; and wherein the plurality of disparate financial sources comprise financial account providers which store the financial transaction account data including financial charge data;

retrieve the financial transaction account data, including the financial charge data, from at least one of the plurality of disparate financial sources in accordance with the data selection criteria;

retrieve the travel transaction data from at least one of the plurality of disparate travel sources in accordance with tile data selection criteria, wherein the travel transaction data includes the travel cost data, the air sectors, and the fare basis codes provided by the air carrier and, wherein the travel transaction data is obtained by the transaction processor;

add proprietary information to the financial transaction account data and the travel transaction data, wherein the proprietary information relates to a host supplier network;

condition the data elements to transform the data elements into a travel expense report, wherein the travel expense report includes line item detail including financial charge data from the financial transaction account data and travel transaction data;

convert the financial transaction account data and the transaction data from the disparate travel sources and the disparate financial sources into a single format;

position each of the data elements in accordance with the categorized view instruction, wherein the data elements are marked as billed or unbilled; and send the travel expense report to the client computer, wherein a user the client computer analyzes the travel expense report to determine a level of spend for a defined item over a defined time.

11. The method of claim 4, wherein the disparate financial sources include regional providers of the corporate transaction account that operate as at least one of: a wholly owned organization, a franchise, and a partnership.

12. The method of claim 11, wherein loyalty points are applied to said travel cost data in order to offset the financial charge data in an amount equal to a value of said loyalty points.

\* \* \* \* \*

UNITED STATES PATENT AND TRADEMARK OFFICE
CERTIFICATE OF CORRECTION

PATENT NO.      : 7,647,257 B2                                          Page 1 of 1
APPLICATION NO. : 10/608764
DATED           : January 12, 2010
INVENTOR(S)     : Allen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1270 days.

Signed and Sealed this

Sixteenth Day of November, 2010

David J. Kappos
*Director of the United States Patent and Trademark Office*